United States Patent
Inokuchi et al.

(10) Patent No.: US 7,480,942 B2
(45) Date of Patent: Jan. 20, 2009

(54) METHOD FOR CONTROLLING ACCESS TO DISC DATA AND METHOD FOR INDENTIFYING DISC

(75) Inventors: Tatsuya Inokuchi, Tokyo (JP); Yoriaki Kanada, Kanagawa (JP); Takao Ihashi, Chiba (JP); Shunsuke Furukawa, Tokyo (JP); Takashi Yamanishi, Tokyo (JP); Yoichiro Sako, Tokyo (JP)

(73) Assignee: Sony Corporation, Tokyo (JP)

( * ) Notice: Subject to any disclaimer, the term of this patent is extended or adjusted under 35 U.S.C. 154(b) by 1037 days.

(21) Appl. No.: 10/474,504

(22) PCT Filed: Feb. 17, 2003

(86) PCT No.: PCT/JP03/01627

§ 371 (c)(1),
(2), (4) Date: Oct. 21, 2003

(87) PCT Pub. No.: WO03/701536

PCT Pub. Date: Aug. 28, 2003

(65) Prior Publication Data

US 2004/0133523 A1 Jul. 8, 2004

(30) Foreign Application Priority Data

Feb. 21, 2002 (JP) ............................ 2002-044566

(51) Int. Cl.
*G06F 21/22* (2006.01)
*G11B 19/02* (2006.01)
(52) U.S. Cl. ..................... 726/27; 705/57; 369/47.1
(58) Field of Classification Search ............. None
See application file for complete search history.

(56) References Cited

U.S. PATENT DOCUMENTS

| 5,930,209 | A | * | 7/1999 | Spitzenberger et al. ... 369/30.05 |
| 6,104,679 | A | * | 8/2000 | Sollish ................... 369/53.21 |
| 6,425,098 | B1 | * | 7/2002 | Sinquin et al. ............. 714/699 |
| 6,597,643 | B1 | | 7/2003 | Mitchell et al. |
| 6,614,740 | B1 | * | 9/2003 | Park et al. ............... 369/59.17 |

(Continued)

FOREIGN PATENT DOCUMENTS

JP 9-282666 10/1997

(Continued)

OTHER PUBLICATIONS

Barrett et al, "CD Q-Subcode Decoding and Display Electrial Engineering 498 Final Project", Dec. 5, 1995, p. 1-13.*

(Continued)

*Primary Examiner*—Christopher A Revak
(74) *Attorney, Agent, or Firm*—Oblon, Spivak, McClelland, Maier & Neustadt, P.C.

(57) ABSTRACT

A method for controlling access to data of a disc, comprising the steps of determining whether or not information intrinsic to a writable disc has been detected from data that had been read from the disc; when the determined result represents that information intrinsic to a writable disc has been detected, determining that the disc is a writable disc and at least restricting a regular operation of the disc; and when the determined result represents that information intrinsic to a writable disc has not been detected, determining that the disc is not a writable disc and executing a regular operation of the disc.

44 Claims, 8 Drawing Sheets

| FORMAT FIELD | RETURN DATA | ESSENTIAL/ NOT ESSENTIAL | DESCRIPTION | USE OF TRACK/ SESSION FIELD |
|---|---|---|---|---|
| 0000 | TOC | ESSENTIAL | TRACK/SESSION NUMBER FIELD DESIGNATES START TRACK NUMBER. WHEN DISC IS MULTI-SESSION DISC,THIS COMMAND RETURNS TRACK NUMBER AA IN TOC DATA OF ALL SESSIONS AND ONLY LEAD-OUT AREA OF LAST SESSION. | TRACK NUMBER |
| 0001 | Session Info | ESSENTIAL | THIS COMMAND RETURNS FIRST SESSION NUMBER, LAST SESSION NUMBER, AND START ADDRESS OF LAST SESSION. TRACK/SESSION NUMBER FIELD IS SET FOR 00. | RESERVED |
| 0010 | Full TOC | ESSENTIAL | THIS COMMAND RETURNS ALL Q SUB CODES OF LEAD-IN (TOC) AREA CORRESPONDING TO SESSION NUMBER DESIGNATED IN TRACK/SESSION NUMBER FIELD. VALUE OF POINT FIELD SUPPORTS A0, A1, A2, TRACK NUMBERS (01 TO 99), B0, B2, B3, B4, C0, AND C1. LBA ADDRESS HAS NOT BEEN DEFINED. TIME BIT IS SET FOR 1. | SESSION NUMBER |
| 0011 | PMA | NOT ESSENTIAL | THIS COMMAND RETURNS ALL Q SUB CODES OF PMA AREA. TRACK/SESSION NUMBER FIELD IS SET FOR 00. LBA ADDRESS HAS NOT BEEN DEFINED.TIME BIT IS SET FOR 1. | RESERVED |
| 0100 | ATIP | NOT ESSENTIAL | THIS COMMAND RETURNS ATIP DATA. TRACK/SESSION NUMBER FIELD IS SET FOR 00. LBA ADDRESS HAS NOT BEEN DEFINED. TIME BIT IS SET FOR 1. | RESERVED |
| 0101 | CD-TEXT | NOT ESSENTIAL | THIS COMMAND RETURNS AS R-W SUB CHANNEL DATA CD-TEXT INFORMATION RECORDED IN LEAD-IN AREA. | RESERVED |
| OTHER FORMAT CODE | | | RESERVED | RESERVED |

U.S. PATENT DOCUMENTS

| | | | |
|---|---|---|---|
| 6,744,713 B1* | 6/2004 | Ko et al. | 369/47.1 |
| 6,765,853 B1* | 7/2004 | Ko et al. | 369/53.21 |
| 6,928,040 B2* | 8/2005 | Christensen | 369/53.21 |
| 6,952,479 B2* | 10/2005 | Shavit et al. | 380/201 |
| 7,062,784 B2* | 6/2006 | Sinquin et al. | 726/26 |
| 7,266,724 B2* | 9/2007 | Denda et al. | 714/24 |
| 2002/0064111 A1* | 5/2002 | Horie | 369/47.54 |
| 2002/0101772 A1* | 8/2002 | Denda et al. | 365/200 |
| 2005/0078577 A1* | 4/2005 | Horie | 369/47.28 |
| 2005/0254383 A1* | 11/2005 | Shavit et al. | 369/53.21 |
| 2005/0254384 A1* | 11/2005 | Shavit et al. | 369/53.21 |
| 2006/0182009 A1* | 8/2006 | Horie | 369/275.1 |

FOREIGN PATENT DOCUMENTS

| | | |
|---|---|---|
| JP | 9-306088 | 11/1997 |
| JP | 10-233079 | 9/1998 |
| JP | 11-185391 | 7/1999 |
| JP | 2000-23089 | 1/2000 |
| JP | 2000-322817 | 11/2000 |
| JP | 2001-67676 | 3/2001 |
| JP | 2001-155410 | 6/2001 |
| JP | 2001-307416 | 11/2001 |
| WO | WO 00/58961 | 10/2000 |

OTHER PUBLICATIONS

"Data Interchange On Read-Only 120 mm optical disks (CD-ROM)", Jun. 1996, Standard ECMA-130, p. 1-57.*

* cited by examiner

FRAME 01
FRAME 02
⋮
FRAME 98

FRAME SYNC PATTERN PORTION | SUB CODE PORTION | DATA AND PARITY PORTION

| FRAME | P | Q | R | S | T | U | V | W |
|---|---|---|---|---|---|---|---|---|
| F01 | S0 | | | | | | | |
| F02 | S1 | | | | | | | |
| F03 | P01 | Q01 | R01 | S01 | T01 | U01 | V01 | W01 |
| F04 | P02 | Q02 | R02 | S02 | T02 | U02 | V02 | W02 |
| ⋮ | ⋮ | ⋮ | ⋮ | ⋮ | ⋮ | ⋮ | ⋮ | ⋮ |
| F95 | P93 | Q93 | R93 | S93 | T93 | U93 | V93 | W93 |
| F96 | P94 | Q94 | R94 | S94 | T94 | U94 | V94 | W94 |
| F97 | P95 | Q95 | R95 | S95 | T95 | U95 | V95 | W95 |
| F98 | P96 | Q96 | R96 | S96 | T96 | U96 | V96 | W96 |

| Byte \ Bit | 7 | 6 | 5 | 4 | 3 | 2 | 1 | 0 |
|---|---|---|---|---|---|---|---|---|
| 0 | OPERATION CODE (43h) | | | | | | | |
| 1 | Reserved | | | | | TIME | Reserved |
| 2 | Reserved | | | | | Format | | |
| 3 | Reserved | | | | | | | |
| 4 | Reserved | | | | | | | |
| 5 | Reserved | | | | | | | |
| 6 | Track / Session number | | | | | | | |
| 7 | (MSB) Allocation Length | | | | | | | |
| 8 | | | | | | | | (LSB) |
| 9 | Control | | | | | | | |

Fig. 8

| FORMAT FIELD | RETURN DATA | ESSENTIAL/ NOT ESSENTIAL | DESCRIPTION | USE OF TRACK/ SESSION FIELD |
|---|---|---|---|---|
| 0000 | TOC | ESSENTIAL | TRACK/SESSION NUMBER FIELD DESIGNATES START TRACK NUMBER. WHEN DISC IS MULTI-SESSION DISC, THIS COMMAND RETURNS TRACK NUMBER AA IN TOC DATA OF ALL SESSIONS AND ONLY LEAD-OUT AREA OF LAST SESSION. | TRACK NUMBER |
| 0001 | Session Info | ESSENTIAL | THIS COMMAND RETURNS FIRST SESSION NUMBER, LAST SESSION NUMBER, AND START ADDRESS OF LAST SESSION. TRACK/SESSION NUMBER FIELD IS SET FOR 00. | RESERVED |
| 0010 | Full TOC | ESSENTIAL | THIS COMMAND RETURNS ALL Q SUB CODES OF LEAD-IN (TOC) AREA CORRESPONDING TO SESSION NUMBER DESIGNATED IN TRACK/SESSION NUMBER FIELD. VALUE OF POINT FIELD SUPPORTS A0, A1, A2, TRACK NUMBERS (01 TO 99), B0, B2, B3, B4, C0, AND C1. LBA ADDRESS HAS NOT BEEN DEFINED. TIME BIT IS SET FOR 1. | SESSION NUMBER |
| 0011 | PMA | NOT ESSENTIAL | THIS COMMAND RETURNS ALL Q SUB CODES OF PMA AREA. TRACK/SESSION NUMBER FIELD IS SET FOR 00. LBA ADDRESS HAS NOT BEEN DEFINED. TIME BIT IS SET FOR 1. | RESERVED |
| 0100 | ATIP | NOT ESSENTIAL | THIS COMMAND RETURNS ATIP DATA. TRACK/SESSION NUMBER FIELD IS SET FOR 00. LBA ADDRESS HAS NOT BEEN DEFINED. TIME BIT IS SET FOR 1. | RESERVED |
| 0101 | CD-TEXT | NOT ESSENTIAL | THIS COMMAND RETURNS AS R-W SUB CHANNEL DATA CD-TEXT INFORMATION RECORDED IN LEAD-IN AREA. | RESERVED |
| OTHER FORMAT CODE | | | RESERVED | RESERVED |

US 7,480,942 B2

METHOD FOR CONTROLLING ACCESS TO DISC DATA AND METHOD FOR INDENTIFYING DISC

TECHNICAL FIELD

The present invention relates to a method for controlling access to data of a disc and a method for determining a disc, in particular, to those suitable for controlling access to a non-original disc produced as a copied disc.

BACKGROUND ART

In recent years, various types of recording mediums used to record digital data have been developed and used. For example, as optical discs, compact discs have been become common. The standard for the compact discs (CD) is referred to as compact disc digital audio (CD-DA). The CD standard is based on the description of the relevant standard document called Red Book. So far, on the basis of the standard document, various types of formats such as CD-ROM standard have been standardized as so-called CD family. In the following description, CD represents CD-DA disc.

The CD family includes reproduction-only type optical discs such as a CD and a CD-ROM (Compact Disc-Read Only Memory) disc and writable record and reproduction type optical discs such as CD-R (Compact Disc-Recordable) disc and a CD-RW (Compact Disc-Rewritable). Once data is written to a CD-R disc, the written data cannot be erased therefrom. After data has been written to a CD-R disc, the written data cannot be rewritten thereto. However, in the present patent application, a CD-R is categorized as a writable record and reproduction type optical disc.

Among them, reproduction-only type optical discs such as a CD and a CD-ROM disc have been widely used to record digital data of commercial software and so forth. For example, at the present time, many CDs for music software and CD-ROM discs for games, programs, and video software have been sold. As the reason why software of digital data is sold with CDs or CD-ROM discs, it is thought that as described above they are reproduction-type optical discs and they can be quantitatively and inexpensively produced in a short time.

Since many users have already had recording and/or reproducing apparatuses that can reproduce those CDs or CD-ROM discs, it is thought that an environment for distributing software as digital data with CDs or CD-ROM discs will not be largely changed.

However, when software of digital data is recoded with CDs or CD-ROM discs, the following problems arise.

At present, data that is read from a reproduction-only optical disc such as a CD or a CD-ROM disc can be easily copied to a writable record and reproduction type optical disc such as a CD-R disc or a CD-RW disc with a recording and reproducing apparatus, copy software, and so forth. However, since a CD was developed as a reproduction-only recording medium, a conventional reproducing apparatus or a conventional recording and reproducing apparatus that reproduces data from a CD, a CD-ROM disc, a CD-R disc, and a CD-RW disc do not have a function for determining whether data that has been reproduced from a disc is original data or copied data. Thus, they can reproduce data from a CD-R disc and a CD-RW disc onto which data has been copied. It is difficult to determine whether or not the current disc is an original disc or a copied disc with the appearance thereof. In such an environment, it was difficult to effectively protect data from being illegally copied. In other words, it was difficult to protect copyright of information recorded on a CD, a CD-ROM disc, and so forth.

Since mediums such as a CD and a CD-ROM disc and their drivers have been widely used, it is difficult to newly add a copy protection function.

Therefore, an object of the present invention is to provide a method for controlling access to data of a disc and a method for determining a disc that allow copyright of data recorded on mediums such as a CD and a CD-ROM disc to be protected without need to largely change the current standards and apparatuses.

DISCLOSURE OF THE INVENTION

To accomplish the foregoing object, claim 1 of the present invention is a method for controlling access to data of a disc, comprising the steps of determining whether or not information intrinsic to a writable disc has been detected from data that had been read from the disc; when the determined result represents that information intrinsic to a writable disc has been detected, determining that the disc is a writable disc and at least restricting a regular operation of the disc; and when the determined result represents that information intrinsic to a writable disc has not been detected, determining that the disc is not a writable disc and executing a regular operation of the disc.

Claim 15 of the present invention is a method for controlling access to data of a disc, comprising the steps of determining whether or not information intrinsic to a writable disc has been detected from data that had been read from a disc having a data area in which data is recorded, a lead-in area that is formed at a position that is earlier read than the data area and on which index data of the data recorded in the data area is recorded, and a lead-out area formed on the outer periphery side of the data area; when the determined result represents that information intrinsic to a writable disc has been detected, determining that the disc is a writable disc and restricting at least a regular operation for the disc; and when the determined result represents that information intrinsic to a writable disc has not been detected, determining that the disc is not a writable disc and executing a regular operation for the disc.

Claim 29 of the present invention is a disc determining method, comprising the steps of determining whether or not information intrinsic to a writable disc has been detected from data that had been read from a loaded disc; when the determined result represents that information intrinsic to a writable disc has been detected, determining that the loaded disc is a writable disc; and when the determined result represents that information intrinsic to a writable disc has not been detected, determining that the loaded disc is not a writable disc.

According to the present invention, when information intrinsic to a writable disc can be read from the loaded disc, it is determined that the loaded disc is a writable disc. When valid information cannot be read from the loaded disc, it is determined that the loaded disc is a read-only disc. When the loaded disc is a read-only disc, it is controlled as an original disc. When the loaded disc is a writable disc, it is controlled as a copied disc. Thus, access to disc information can be controlled without need to change conventional drives and disc formats.

In addition, when a condition with respect to recording is read from information of the loaded disc and the condition is intrinsic to a read-only disc, it is determined that the loaded disc should be a read-only disc. When the condition is intrinsic to a writable disc, it is determined that the loaded disc is a writable disc. When the loaded disc is a read-only disc, it is controlled as an original disc. When the loaded disc is a writable disc, it is controlled as a copied disc. Thus, access to disc information can be controlled corresponding to the determined result without need to change conventional drives and disc formats.

When information that is read from the loaded disc satisfies a condition intrinsic to a read-only disc, it is determined that the loaded disc should be a read-only disc. When the information satisfies a condition intrinsic to a writable disc, it is determined that the loaded disc should be a writable disc. When the loaded disc is a read-only disc, it is controlled as an original disc. When the loaded disc is a writable disc, it is controlled as a copied disc. Thus, access to disc information can be controlled corresponding to the determined result without need to change conventional drives and disc formats.

BRIEF DESCRIPTION OF DRAWINGS

FIG. 7 is a schematic diagram showing CDB of TOC/PMA/ATIP.

FIG. 8 is a schematic diagram showing the detail of a format field of READ PMA/ATIP commands.

BEST MODES FOR CARRYING OUT THE INVENTION

Figure 1:
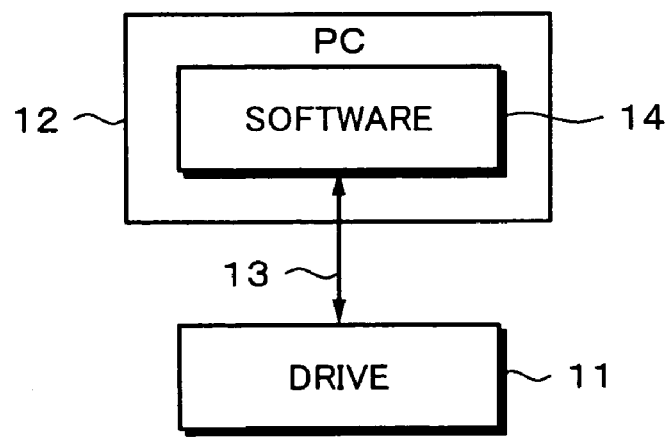
FIG. 1 is a schematic diagram showing an example of a computer system according to an embodiment of the present invention.

Next, with reference to the accompanying drawings, an embodiment of the present invention will be described. First of all, a method for controlling access to disc according to the embodiment of the present invention will be described. FIG. 1 is a schematic diagram showing the structure of an example of a computer system that accomplishes the method for controlling access to disc according to the embodiment of the present invention. In other words, the method for controlling access to disc according to the present embodiment is applied to the case that data is recorded to and reproduced from a disc using a computer.

A computer system shown in FIG. 1 comprises a drive 11 such as a CD-ROM drive, a CD-R drive, or a CD-RW drive, a PC (personal computer) 12, and an interface 13 that connects the drive 11 and the PC 12. Examples of the interface 13 are a SCSI (Small Computer System Interface), a USB (Universal Serial Bus), and an IEEE (The Institute of Electrical and Electronics Engineers, Inc.) 1394. With the interface 13, the PC 12 side can reference information recorded on a disc loaded into the drive 11. In this example, the drive 11 is a mechanism that reproduces or records data to or from a CD-ROM disc, a CD-R disc, and a CD-RW disc and an apparatus or a part thereof that has at least a part of a signal processing portion necessary for reproducing data or recording data.

Software 14 has been installed into the PC 12. The software 14 is so-called an application program such as game software or an installer. The software 14 contains a determining program that determines the type of the disc loaded into the drive. Output devices such as a display and a speaker and input devices such as a keyboard (not shown) are connected to the PC 12. In addition, the PC 12 has a storing device from which data is read and written corresponding to an input of the input devices and that stores data to be output to the output devices; and a central processing unit that performs arithmetic operations and controlling processes.

Next, the determining program contained in the software 14 will be described. Generally, on discs sold on the market, original data has been stored (hereinafter those discs are referred to as original discs). Those discs are reproduction-only discs such as CDs and CD-ROM discs. However, a conventional disc reproducing apparatus such as a CD-ROM drive, a CD-R drive, or a CD-RW drive does not have a function for determining whether the loaded disc is a reproduction-only disc or a writable recode and reproduction disc.

Thus, according to the present embodiment, it is determined whether the disc loaded into the drive 11 is a reproduction-only disc or a writable disc with information that is stored thereon and that can be referenced from the outside so as to determine whether or not the disc loaded into the drive 11 is an original disc.

To do that, the differences between the data format of a reproduction-only disc and the data format of a writable disc are used (the details will be described later). On a writable disc, information intrinsic thereto that can be accessed from the outside for example address information necessary for rewriting data, information about blank positions, and so forth has been written. The information intrinsic to a writable disc is not present on a reproduction-only disc. When information that is not present on a reproduction-only disc is present on a disc loaded into the drive 11, it can be determined that the disc loaded into the drive is not an original disc, but a writable disc, namely a copied disc.

A reproduction-only disc and a writable disc are difference from each other in information with respect to recording of their TOC (Table Of Contents) data. Thus, information with respect to recording is read from a disc loaded into the drive 11. When the information that has been read is information intrinsic to a reproduction-only disc, it can be determined that the disc loaded into the drive 11 should be an original disc. When the information that has been read is information intrinsic to a writable disc, it can be determined that the disc loaded into the drive 11 is not an original disc, but a writable disc, namely, a copied disc.

Next, before the description for a method for determining whether the type of the disc loaded into the drive 11 is a CD/CD-ROM disc or a CD-R/CD-RW disc, the structure of a CD, a CD-ROM disc, a CD-R disc, and a CD-RW disc will be described.

Figure 2:
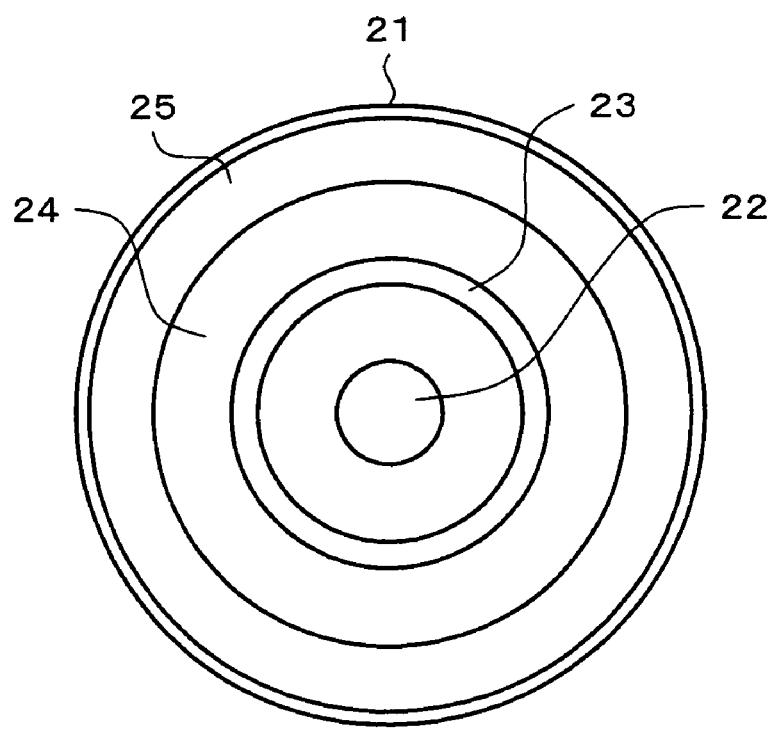
FIG. 2 is a schematic diagram showing areas of an optical disc.

FIG. 2 shows the structure of an optical disc 21 such as a CD, a CD-ROM disc, a CD-R disc, and a CD-RW. The diameter of the optical disc 21 is 120 mm. At the center of the optical disc 21, a hole 22 is formed. There is another type of the optical disc 21 that is so-called a CD single having a diameter of 80 mm. The optical disc 21 is mainly composed of a disc substrate, a recording layer, and a protecting layer. In addition, a recordable optical disc has a reflecting film made of a metal and disposed between the recording layer and the protecting layer.

On the optical disc 21, a lead-in area 23, a program area 24, and a lead-out area 25 are formed successively from the inner periphery to the outer periphery. In the lead-in area 23, TOC data for managing programs is recorded. In the program area 24, program data is recorded. The lead-out area 25 is a program end area.

A CD and a CD-ROM disc are reproduction-only optical discs. As the material of the recording layer, aluminum is used. A CD and a CD-ROM disc are quantitatively produced in such a manner that a disc substrate is produced by a stamper and an injection molding machine, a recording layer made of aluminum is coated on the substrate, and then music data, program software, or the like is recorded on the CD and the CD-ROM disc. After music data, program software, or the like has been recorded on the CD and the CD-ROM disc, they are sold.

A CD-R disc is writable. As the recording layer, an organic coloring matter material such as phthalocyanine or cyanine is used. When data is written to a CD-R disc, the recording layer made of the organic coloring matter material is heated by laser light. Since the recording layer made of the organic coloring matter material is heated, the disc substrate is thermally deformed.

A CD-RW disc is rewritable. As the recording layer, a phase change material is used. As the phase change material, an alloy of Ag—In—Sb—Te (silver-indium-antimony-tellurium) or the like is used. Such a material has a crystal phase and an amorphous phase. The reflectance of the crystal phase is different from that of the amorphous phase. Data that is recorded using the differences of reflectance is read.

A CD-R disc and a CR-RW disc are sold in the state that no is recorded. The user records music data and data of program software to those discs or reproduces them therefrom.

On a CD, a CD-ROM disc, a CD-R disc, and a CD-RW disc, digital data of audio data, program data, and so forth is recorded in the program area 24. Address data such as time information of the digital data is managed in the lead-in area 23. When the disc recording and reproducing apparatus has finished reading digital data from the program area 24 and the optical pickup has reached the lead-out area 25, the apparatus finishes the disc reproducing operation.

On a CD, a CD-ROM disc, a CD-R disc, and a CD-RW disc, along with main data such as audio data and program data, sub code data has been recorded.

An analog audio signal recorded on a CD, a CD-ROM disc, a CD-R disc, and a CD-RW disc is sampled at a sampling frequency of 44.1 kHz with 16 bits per sample or word. 16 bits of one sample or one word of the sampled data are divided into high order eight bits and low order eight bits as two symbols. An error correction code encoding process and an interleaving process are performed in the unit of one symbol. Every 24 symbols of audio data are grouped as one frame. One frame is equivalent to six samples for a left stereo channel and six samples for a right stereo channel. By an EFM modulation, eight bits of each symbol is converted into 14 bits.

Figure 3:
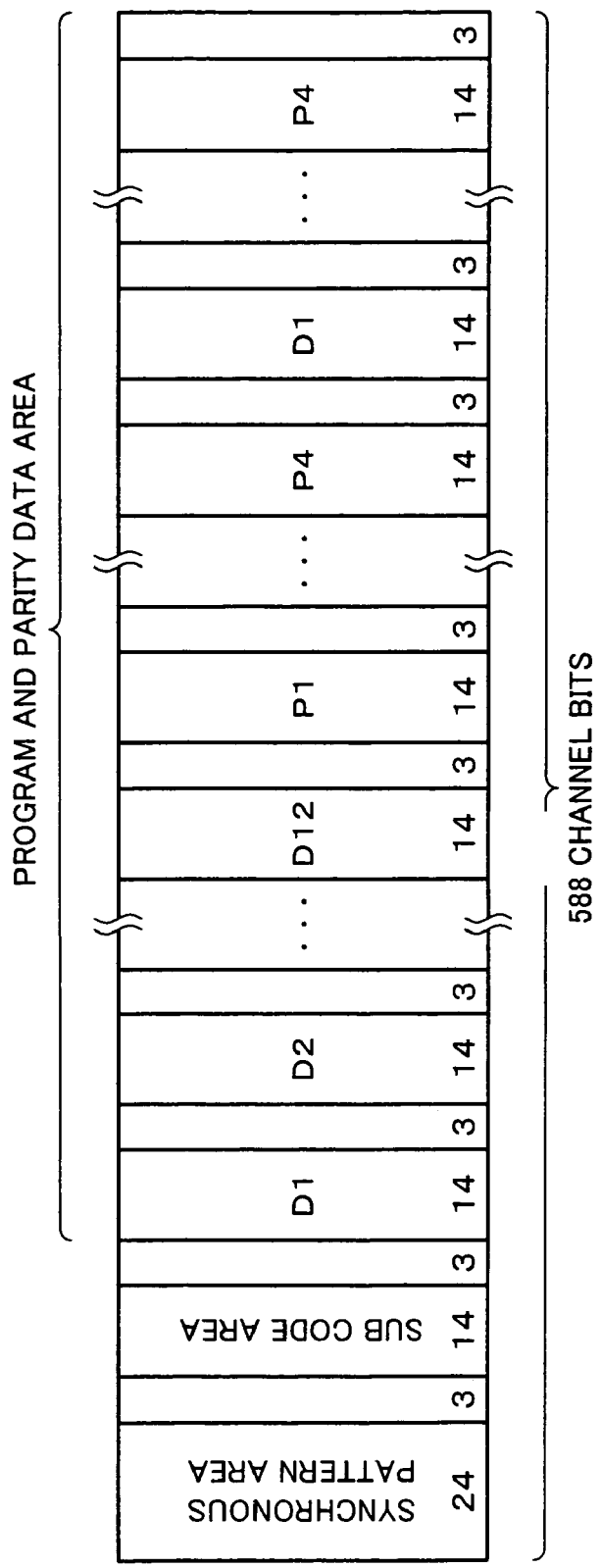
FIG. 3 is a schematic diagram showing data of one frame.

FIG. 3 shows the structure of data of one frame that has been EFM-modulated. As shown in FIG. 3, one frame is composed of a synchronous pattern data area of 24 channel bits, a sub code area of 14 channel bits, and a program data and parity data area of (32×14) channel bits. Each area and each data portion are connected with connection bits of three channel bits. Thus, one frame contains data of a total of 588 channel bits. 98 frames composes one sub code block.

Figures 4, 5:
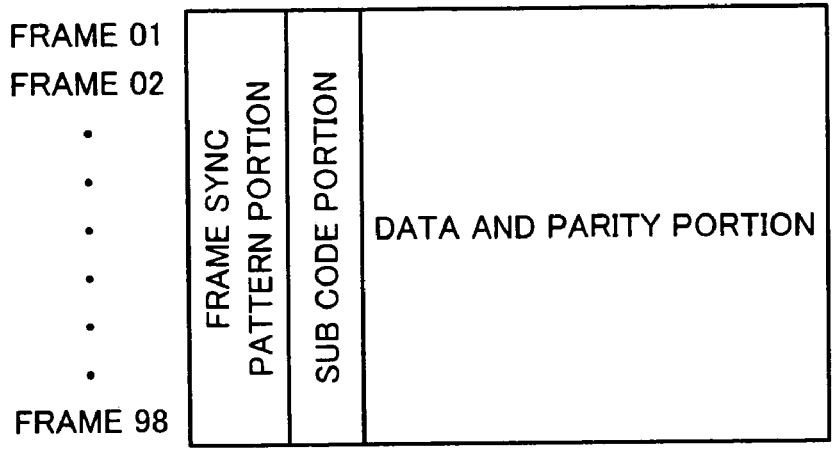
FIG. 4 is a schematic diagram for describing the data structure of an entire sub code frame.
FIG. 5 is a schematic diagram showing data of all channels of a sub code signal.

FIG. 4 shows the structure of a sub code data block. As shown in FIG. 4, a sub code frame is composed of a frame sync pattern portion, a sub code portion, and a data and parity portion. One sub code frame is equivalent to 1/75 seconds of a reproduction time.

As shown in FIG. 5, as data of the sub code portion, the beginning frames F1 and F2 are sub code frame sync patterns S0 and S1, respectively. Like frame sync patterns, the sub code frame sync patterns are out-of-rule patterns according to the EFM modulating system. In addition, eight bits of one symbol composes P channel to W channel of the sub code, respectively. For example, P channel is composed of a part of S0, a part of S1, and P01 to P96.

P channel of the sub code data contains information depending on whether or not there is a program. Q channel of the sub code data contains absolute time information of the CD, time information of each program, program number (also referred to as track number), movement number (also referred to as index), and so forth. Thus, with information contained in Q channel, a reproducing operation such as a program-top-position detection can be controlled. With information of Q channel displayed, the number of the currently played program, the elapsed time of the performance, and the absolute time of the performance from the beginning of the optical disc can be visually checked.

In addition, data of six channels of R channel to W channel of the sub code data can be used for displaying for example still pictures and song lyrics.

Figure 6A:
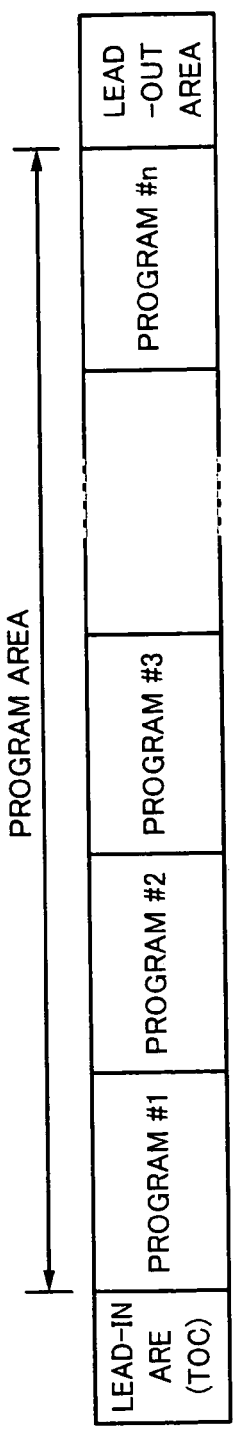
FIG. 6A is a schematic diagram showing the structure of data recorded on a CD, a CD-ROM disc, a CD-R disc, and a CD-RW disc.

FIG. 6A shows data recorded on a CD, a CD-ROM disc, a CD-R disc, and a CD-RW disc. As described in FIG. 2, TOC data recorded in the lead-in area 23, programs No. 1 to No. n recorded in the program area 24, and data recorded in the lead-out area 25 are successively formed from the inner periphery side to the outer periphery side of the disc. A set of the lead-in area 23, the program area 24, and the lead-out area 25 is referred to as session. The disc shown in FIG. 2 is composed of one session. On the other hand, a disc having a plurality of sets of the lead-in area 23, the program area 24, and the lead-out area 25 is referred to as multi-session disc.

Figure 6B:
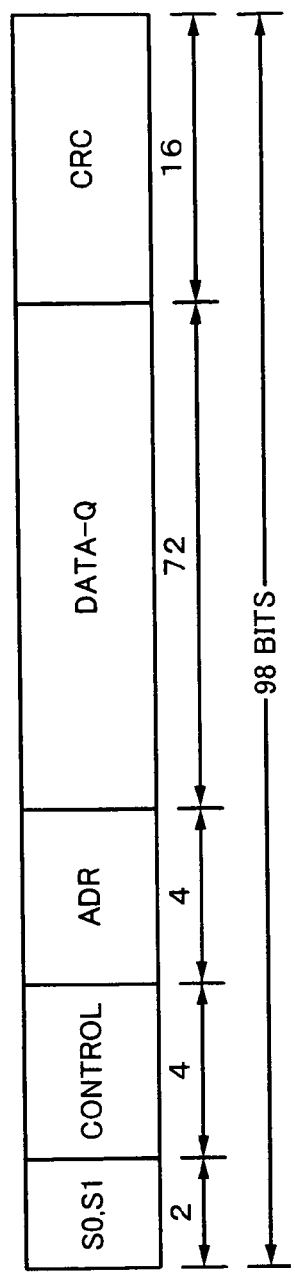
FIG. 6B is a schematic diagram showing the structure of TOC data.

TOC data recorded on conventional CD, CD-ROM disc, CD-R disc, and CD-RW disc uses Q channel of sub code data shown in FIG. 6B. The sub code data has a structure of which 98 bits composes one frame.

S0 and S1 are sub code sync signals having out-of-rule patterns according to the EFM modulating system shown in FIG. 5. A control field represents the number of channels and pre-emphasis ON/OFF. An address (ADR) field represents control bits for DATA-Q. A CRC field represents a CRC (Cyclic Redundancy Check) for a control, an address (ADR), and DATA-Q. Generation polynomial P (X) is P (X)=$X^{16}$+$X^{12}$+$X^5$+1.

Figure 6C:
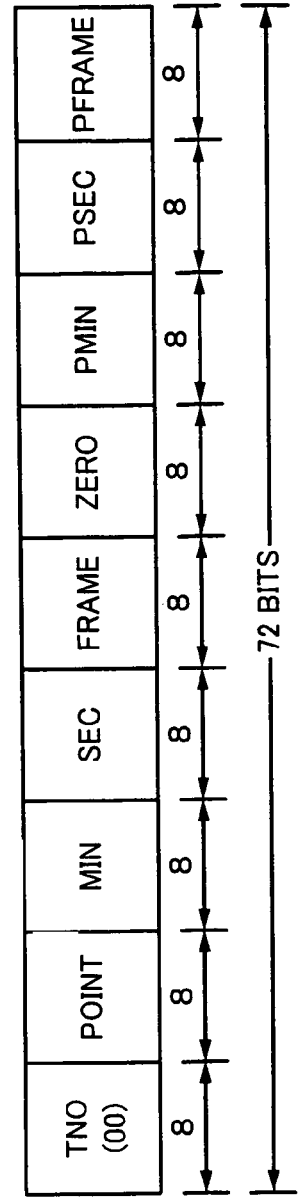
FIG. 6C is a schematic diagram showing the format of DATA-Q in a lead-in area.

FIG. 6C shows the format of DATA-Q in the lead-in area. A TNO field represents a track number in two-digit BCD (Binary code decimal). As shown in FIG. 6C, at the lead-in track, the value of TNO is "00". At the lead-out track, the value of TNO is "AA (hexadecimal)". ZERO has eight bits that are normally all 0. A POINT field represents a program number, a lead-in track, a lead-out track, and so forth. MIN, SEC, and FRAME fields and PMIN, PSEC, and PFRAME fields represent a minute, a second, and a frame in six-digit BCD. MIN, SEC, and FRAME fields and PMIN, PSEC, and PFRAME fields are defined in various manners depending on the address (ADR) and the value of POINT.

When the track format (Q sub channel) of TOC data in the lead-in area is defined as address (ADR)=1 (mode 1), the value of POINT (hexadecimal) and the corresponding values of MIN, SEC, FRAME, ZERO, PMIN, PSEC, and PFRAME are as follows. In the following description, x0 of each value represents hexadecimal notation. In other words, eight bits in binary is represented with two digits in hexadecimal.

POINT: 01 to 63 (track number reference)
MIN, SEC, FRAME: absolute time
ZERO: 0x00
PMIN, PSEC, PFRAME: track start position
    POINT: A0 (first track number in program area)
MIN, SEC, FRAME: absolute time
ZERO: 0x00
PMIN: fast track number
PSEC: disc type
PFRAME: 0x00
    POINT: A1 (last track number of program area)
MIN, SEC, FRAME: absolute time
ZERO: 0x00
PMIN: last track number
PSEC: 0x00
PFRAME: 0x00
    POINT: A2 (start position of lead-out area)
MIN, SEC, FRAME: absolute time
ZERO: 0x00
PMIN, PSEC, PFRAME: start position of lead-out
    When the track format (Q sub channel) of TOC data in the lead-in area is defined as address (ADR)=5 (mode 5), the value of POINT and the corresponding values of MIN, SEC, FRAME, ZERO, PMIN, PSEC, and PFRAME are as follows.
    POINT: 01 to 40 (skip interval pointer)
MIN, SEC, FRAME end time of skip interval
ZERO: reserved
PMIN, PSEC, PFRAME: start time of skip interval in playback
    POINT: B0 (used to certificate multi-session disc containing start time of next available program area)
MIN, SEC, FRAME: start time of next available program in recordable area
ZERO: pointer of mode 5
PMIN, PSEC, PFRAME: maximum start time of outermost lead-out area in disc recordable area
    POINT: B1 (number of skip interval pointer and assignment of skip track)
MIN, SEC, FRAME: 0x00, 0x00, 0x00
ZERO: 0x00
PMIN: skip interval pointer (N≦40)
PSEC: skip interval pointer (N≦21)
PFRAME: 0x00
    POINT: B2 to B4 (skip track assignment pointer)
MIN, SEC, FRAME: skip
ZERO: skip
PMIN, PSEC, PFRAME: skip
    POINT: C0 (start time of first lead-in area of disc, present only in fast lead-in area)
MIN: optimum recording power
SEC, FRAME: reserved
ZERO: reserved
PMIN, PSEC, PFRAME: start time of first lead-in area of disc
    POINT: C1 (copy of information from rewritable area of ATIP (Absolute Time in Pre-Grove) MIN, SEC, FRAME, ZERO, PMIN, PSEC, PFRAME: copy of information from POINT "A1" of ATIP
    Mediums of the CD family have been already described. Next, some differences among a CD, a CD-ROM disc, a CD-R disc, and a CD-RW disc will be described.
    Writable discs such as a CD-R disc and a CD-RW disc have on an inner periphery of the lead-in area a PMA (Program Memory Area) that temporarily stores address information for data that is rewritten. Those discs also have on an inner periphery of the PMA a PCA (Power Calibration Area) for adjusting laser power with which data is recorded. However, when data is written in the Disc At Once mode, a PMA is not formed on a disc. Reproduction-only discs such as a CD and a CD-ROM disc do not have a PMA. The information of a PMA can be read by a CD-R drive and a CD-RW drive, which can read data from an inner periphery than the lead-in area.
    Writable discs such as a CD-R disc and a CD-RW disc have an ATIP (Absolute Time In Groove) used as addresses with which data is recorded. In addition to address data with which data is recorded, the ATIP records special information that can be referenced from the outside. The special information of the ATIP is information that represents write characteristic, capacity, disc type, and so forth of a writable blank disc on which no data has been recorded. The special information of the ATIP can be read by a CD-R drive and a CD-RW drive that can read the ATIP.
    In the case of multi-session discs, a CD, a CD-ROM disc, a CD-R disc, and a CD-RW disc (of which data is written in rewrite mode; normally, data is written on a multi-session disc in rewrite mode) have differences in their unique Q sub code values.
    In the cases of a CD and a CD-ROM disc, when the TOC data contains ADR=5 and POINT=B0, PMIN, PSEC, and PFRAME accord with the start time of the lead-out of the last session. However, in the cases of a CD-R disc and a CD-RW disc, sometimes they may not. In other words, when the TOC data contains ADR=5 and POINT=B0, PMIN, PSEC, and PFRAME represent the capacity of the disc. In the case of a CD-ROM disc, PMIN, PSEC, and PFRAME represent the start time of the lead-out of the last session. In the cases of a CD-R disc and a CD-RW disc, PMIN, PSEC, and PFRAME represent the recordable capacity (for example, when the disc is a 74-minute disc, PMIN, PSEC, and PFRAME represent a value corresponding to the position of 74 minutes).
    In the cases of a CD and a CD-ROM disc, the TOC data of the last session does not contain ADR=5 and POINT=B0. However, in the cases of a CD-R disc and a CD-RW disc, sometimes the TOC data of the last session may contain ADR=5 and POINT=B0. In other words, in the cases of a CD and CD-ROM disc, since the TOC data does not contain ADR=5 and POINT=B, they represents the last session. Thus, a disc that contains ADR=5 and POINT=B0 represents that the disc is neither a CD, nor a CD-ROM disc.
    In the cases of a CD and a CD-ROM disc, when the TOC data of the first session contains ADR=5 and POINT=C0, all MIN, SEC, FRAME, and ZERO are 0x00. In the case of a CD-R disc, sometimes MIN is not 0x00. However, in the case of a CD-RW, MIN and FRAME are always any values other than 0x00. In other words, in the cases of a CD and a CD-ROM disc, all MIN, SEC, FRAME, and ZERO are 0x00. However, in the cases of a CD-R disc and a CD-RW disc, MIN, SEC, FRAME, and ZERO are used for ATIP information.
    In the cases of a CD and a CD-ROM disc, when the TOC data of the first session contains ADR=5 and POINT=C0, PMIN, PSEC, and PFRAME are always 0x95, 0x00, and 0x00, respectively. However, in the cases of a CD-R disc and a CD-RW disc, PMIN, PSEC, and PFRAME are not 0x95, 0x00, and 0x00, respectively. In other words, in the cases of a CD and a CD-ROM disc, PMIN, PSEC, and PFRAME are always 0x95, 0x00, and 0x00, respectively. However, in the cases of a CD-R disc and a CD-RW disc, PMIN, PSEC, and PFRAME designate the beginning write position.

In the case of only a CD-RW disc, the TOC data of the first session contains ADR=5 and POINT=C1. In other words, in the cases of a CD, a CD-ROM disc, and a CD-R disc, ADR=5 and POINT=C1 are reserved in the TOC data. In the case of a CD-RW disc, the TOC data contains ADR=5 and POINT=C1 for ATIP information.

Thus, by checking the differences, it can be determined whether the disc type loaded into the drive 11 is a CD/CD-ROM disc or a CD-R disc/CD-RW disc.

FIG. 7 is a schematic diagram showing an example of CDB (Command Description Block) of READ TOC/PMA/ATIP command, namely, the ATAPI (At Attachment Packet Interface) commands of the SCSI (Small Computer System Interface)-3 MMC (Multi Media Commands). These commands serve to read information from the TOC, PMA, and ATIP of a CD, a CD-ROM disc, a CD-R disc, and a CD-RW disc.

The CDB of the READ TOC/PMA/ATIP commands shown in FIG. 7 is composed of 10 bytes (one byte is composed of eight bits). OPERATION CODE of the 0-th bit to seventh bit of the 0-th byte is an operation code for a CD-ROM drive or the like. Code number 43 (hexadecimal) is an operation code for READ TOC/PMA/ATIP.

The 0-th bit of the first byte is "Reserved". In the following description, bits or a field denoted by "Reserved" represents that data has not been defined (reserved). Normally, nulls are written to bits or a field denoted by "Reserved". If other data is written to bits or a field denoted by "Reserved", the written data is ignored.

The first bit of the first byte represents a time bit. When the time bit is "0", it represents that the start address field contains a logical block address. When the time bit is "1", the logical block address field contains a time address.

Four bits of the 0-th to third bits of the second byte represents a format field. When the code of the format field is varied to a predetermined value, TOC, PMA, or ATIP from which information is obtained is designated. The details of the format field will be described later.

The 0-th to seventh bits of the sixth byte represents a track/session number field. The track/session number field is a field for designating a start track/session number of return data.

The seventh and eighth bytes represent an allocation length field of which the 0-th bit of the eighth byte is LSB (Least significant bit) and the seventh bit of the seventh byte is MSB (most significant bit). The allocation length field represents the length of assigned data.

The 0-th bit to seventh bit of the ninth byte represent a control field. The control field represents the attribute of the track.

Next, the details of the foregoing format field will be described.

FIG. 8 is a schematic diagram showing the types of format codes written to the format field.

As shown in FIG. 8, when the binary code of the format field is "0000", TOC data is return data. The TOC data is information with respect to addresses of tracks of recorded information and so forth. The TOC data is essential information for discs of the CD family. A track/session number field represents the start track number of return data. When this command is used for a multi-session disc, in the TOC data of all the sessions and the lead-out area of the last session, track number "AA" is returned.

When the binary code of the format field is "0001", information with respect to the sessions is return data. The information with respect to the sessions is essential information for discs of the CD family. This format returns the first session number, the last session number, and the start addresses of the last session. In the format, the track/session number field is set for "00".

When the binary code of the format field is "0010", information with respect to the full TOC is return data. The full TOC data is essential information for discs of the CD family. This format returns all Q sub code data of the TOC data in the lead-in area corresponding to the session number designated in the track/session number field. A logic unit in the mode supports POINT field values "A0", "A1", and "A2", track numbers "B0", "B1", "B2", "B3", "B4", "C0", and "C1". The LBA address has not been defined. The time bit is set for "1".

When the binary code of the format field is "0011", information recorded in the PMA is return data. The information recorded in the PMA is temporary TOC data for which data is rewritten. The information recorded in the PMA is non-essentially present on discs of the CD family. In other words, the information recorded in the PMA is not present on a CD and a CD-ROM disc, but present on writable discs such as a CD-R disc and a CD-RW disc. However, when data is written in the Disc At Once mode, the PMA is not present. This format returns all Q code data of the MPA. In the format, the track/session number field is set for "00". The LBA address has not been defined. The time bit is set for "1".

When the binary code of the format field is "0100", special information of the ATIP is return data. The special information of the ATIP is information such as writing characteristic, capacity, and disc type of a blank descry as described above. The special information of the ATIP is non-essentially present on discs of the CD family. In other words, the special information of the ATIP is not present on a CD and a CR-ROM disc, but on writable discs such as a CD-R disc and a CD-RW disc. In the format, the track/session number field is set for "00". The LBA address has not been defined. The time bit is set for "1".

When the binary code of the format field is "0101", CD-TEXT information is return data. The CD-TEXT information is non-essentially present on discs of the CD family. This format returns as R-W sub channel data CD-TEXT information recorded in the lead-in area.

The format field is structured so that it can deal with other format codes.

Thus, before data is read from a disc loaded into the drive 11 by for example game software or an installer, when the application program is set so that Format=0011 (PMA) of the READ TOC/PMA/ATIP commands is issued, it can be determined that a disc on which information recorded in the PMA is present is a CD-R disc or a CD-RW disc. Likewise, when the application program is set so that Format=0100 (ATPI) of the READ TOC/PMA/ATIP commands is issued, it can be determined that a disc on which special information of the ATIP is present is a CD-R disc or a CD-RW disc.

Moreover, when the application program is set so that Format=0010 (All Sub-Q) of the READ TOC/PMA/ATIP commands is issued, it can be determined that a disc of which PMIN, PSEC, and PFRAME in the case that the TOC contains ADR=5 and POINT=B0 do not comply with the start time of the lead-out of the last session is a CD-R disc or a CD-RW disc. In addition, it can be determined that a disc whose last session contains ADR=5 and POINT=B0 is a CD-R disc or a CD-RW disc.

It can be determined that a disc of which all MIN, SEC, FRAME, and ZERO in the case that the TOC data of the first session contains ADR=5 and POINT=C0 are not 0x00 is a CD-R disc or a CD-RW disc. In addition, it can be determined that a disc of which PMIN, PSEC, and PFRAME are not 0x95, 0x00, and 0x00, respectively in the case that the TOC data of the first session contains ADR=5 and POINT=C0 is a CD-R disc or a CD-RW disc. It can be determined that a disc of which the TOC data of the first session contains ADR=5 and POINT=C1 is a CD-RW disc.

Figure 9:
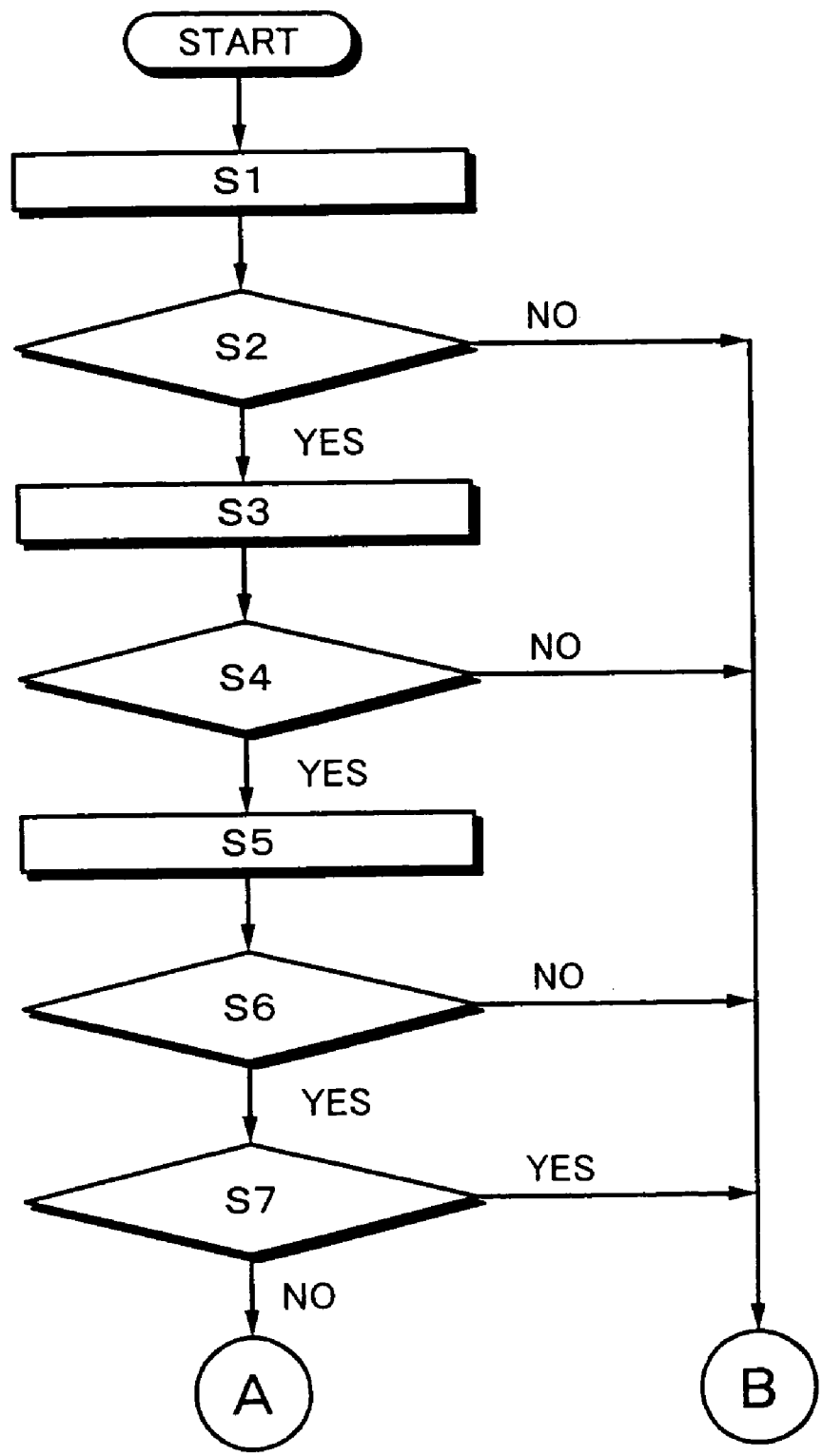
FIG. 9 is a flow chart (first half portion) of a flow chart for determining whether the loaded disc is a CD/CD-ROM or a CD-R/CD-RW according to the embodiment of the present invention.
Figure 10:
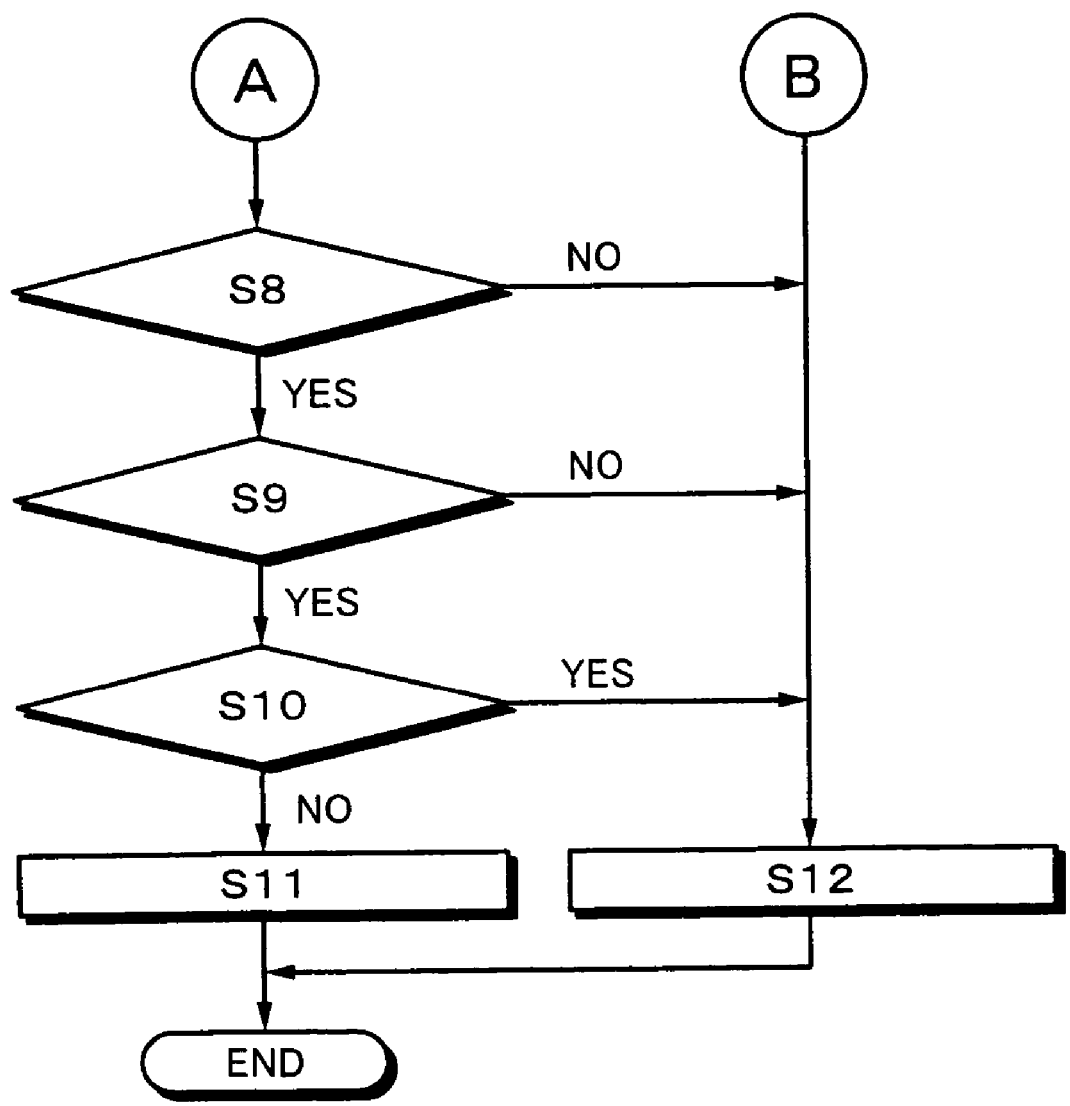
FIG. 10 is a flow chart (second half portion) of the flow chart for determining whether the loaded disc is a CD/CD-ROM or a CD-R/CD-RW according to the embodiment of the present invention.

Next, the operation of the foregoing determining program will be described. FIG. 9 and FIG. 10 are flow charts showing an example of a program that has the foregoing commands.

After the program has started, Format=0011 (PMA) of the READ TOC/PMA/ATIP commands is issued (at step S1). Thereafter, it is determined whether the result is an error or invalid data (at step S2).

When the determined result at step S2 represents that the result is neither an error nor invalid data, a process for a copied disc, namely a CD-R disc or a CD-RW disc is performed. For example, a message that represents that an error has occurred or the loaded disc is an invalid disc is displayed and the reproducing operation is stopped in the middle or immediately (at step S12). Thereafter, the execution of the program is finished.

When the determined result at step S2 represents that the result is an error or invalid data, Format=0100 (ATIP) of the READ TOC/PMA/ATIP commands is issued (at step S3). Thereafter, it is determined whether the result is an error or invalid data (at step S4).

When the determined result at step S4 represents that the result is neither an error nor invalid data, the process for a copied disc, namely a CD-R disc or a CD-RW disc is performed. For example, a message that represents that an error has occurred or the loaded disc is an invalid disc is displayed and the reproducing operation is stopped immediately or with a delay (at step S12). Thereafter, the execution of the program is finished.

When the determined result at step S4 represents that the result is an error or invalid data, Format=0010 (All Sub-Q) of the READ TOC/PMA/ATIP commands is issued (at step S5). Thereafter, it is determined whether the values of PMIN, PSEC, and PFRAME in the case that ADR=5 and POINT=B0 accord with the start time of the lead-out of the last session (at step S6).

When the determined result at step S6 represents that PMIN, PSEC, and PFRAME in the case that ADR=5 and POINT=B0 do not accord with the start time of the lead-out of the last session, the process for a copied disc, namely a CD-R disc or a CD-RW disc is performed. For example, a message that represents that an error has occurred or that the loaded optical disc is an invalid optical disc is displayed and the reproducing operation is stopped immediately or with a delay (at step S12). Thereafter, the execution of the program is finished.

When the determined result at step S6 represents that PMIN, PSEC, and PFRAME in the case that ADR=5 and POINT=B0 accord with the start time of the lead-out of the last session, it is determined whether or not the last session contains ADR=5 and POINT=B0 (at step S7).

When the determined result at step S7 represents that the last session contains ADR=5 and POINT=B0, the process for a copied disc for example a CD-R disc or a CD-RW disc is performed. For example, a message that represents that an error has occurred or the loaded disc is an invalid disc is displayed and the reproducing operation is stopped immediately or with a delay (at step S12). Thereafter, the execution of the program is finished.

When the determined result at step S7 represents that the last session does not contain ADR=5 and POINT=B0, it is determined whether or not all the values of MIN, SEC, FRAME, and ZERO in the case that the first session contains ADR=5 and POINT=C0 are 0x00 (at step S8).

When the determined result at step S8 represents that all the values of MIN, SEC, FRAME, and ZERO in the case that the last session contains ADR=5 and POINT=B0 are not 0x00, the process for a copied disc, namely a CD-R disc or a CR-RW disc is performed. For example, a message that represents that an error has occurred or that the loaded disc is an invalid disc and the reproducing operation is stopped immediately or with a delay (at step S12). Thereafter, the execution of the program is finished.

When the determined result at step S8 represents that all the values of MIN, SEC, FRAME, and ZERO in the case that the first session contains ADR=5 and POINT=C0 are 0x00, it is determined whether or not the values of PMIN, PSEC, and PFRAME in the case that the first session contains ADR=5 and POINT=C0 are 0x95, 0x00, and 0x00, respectively (at step S9).

When the determined result at step S9 represents that the values of PMIN, PSEC, and PFRAME in the case that the first session contains ADR=5 and POINT=C0 are not 0x95, 0x00, and 0x00, respectively, the process for a copied disc, namely a CD-R disc or a CD-RW disc is performed. For example, a message that represents that an error has occurred or that the loaded disc is an invalid disc is displayed and the reproducing operation is stopped immediately or with a delay (at step S12). Thereafter, the execution of the program is finished.

When the determined result at step S9 represents that the values of PMIN, PSEC, and PFRAME in the case that the first session contains ADR=5 and POINT=C0 are 0x95, 0x00, and 0x00, respectively, it is determined whether or not the first session contains ADR=5 and POINT=C1 (at step S10).

When the determined result at step S10 represents that the first session contains ADR=5 and POINT=C1, the process for a copied disc, namely a CD-R disc or a CD-RW disc is performed. For example, a message that represents that an error has occurred or that the loaded disc is an invalid disc is displayed and the reproducing operation is stopped immediately or with a delay (at step S12). Thereafter, the execution of the program is finished.

When the determined result at step S10 represents that the first session does not contain ADR=5 and POINT=C1, a process for an original disc, namely a CD disc or a CD-ROM disc is performed. For example, the regular process (a music program is played or recorded data is captured) (at step S11). Thereafter, the execution of the program is finished.

Thus, the computer system having the foregoing structure operates as follows.

When the optical disc is loaded into the drive 11, the PC 12 reads information intrinsic to a writable disc from the drive 11 through the interface 13 using the software 14. When an error has not occurred or the information has not been invalid, namely the information has been correctly read, the software 14 determines that the disc loaded into the drive 11 is not a reproduction-only disc.

The software 14 reads a condition with respect to the record of the TOC data from the drive 11 through the interface 13. When the information that has been read is intrinsic to a reproduction-only disc, the software 14 determines that the disc loaded into the drive 11 is a reproduction-only disc. When the information that has been read is information intrinsic to a writable disc, the software 14 determines that the disc loaded into the drive 11 is not a reproduction-only disc.

When the software 14 has determined that the disc loaded into the drive 11 is not a reproduction-only disc, the software 14 determines that the disc loaded into the drive 11 is a copied disc. At that point, the process for a copied disc is performed. For example, an alarm message is output to the display. The further operation is cancelled. Data on the disc is not accessed. For example, access to disc information is restricted in such a manner that encrypted data that has been recorded on the disc is not decrypted.

In contrast, when the determined result of the software 14 represents that the disc loaded into the drive 11 is a reproduction-only disc, it is determined that the disc is an original disc. At that point, a process for an original disc is performed. For example, when the disc loaded into the drive 11 is a music CD, a music program is reproduced therefrom. When the disc loaded into the drive 11 is a game CD-ROM disc, a game program and data is read therefrom. In other words, the regular operation is performed.

As described above, according to the present embodiment, information intrinsic to a writable disc is read from a disc loaded into the drive 11. When valid data has been read without an error, it can be determined that the disc loaded into the drive 11 is not a reproduction-only disc.

When the disc to be determined is a disc of the CD family and the drive 11 is a recording/reproducing apparatus for a CD-R disc or a CD-RW disc, Format=0011 (PMA) of the READ TOC/PMA/ATIP commands is issued. As a result, it can be determined whether the disc loaded into the drive 11 is a reproduction-only disc such as a CD or a CD-ROM disc or a writable disc such as a CD-R disc or a CD-RW disc.

According to the present embodiment, a condition with respect to the record of the TOC data is read from the disc loaded into the drive 11. When the data that has been read from the disc is information intrinsic to a reproduction-only disc, it is determined that the disc loaded into the drive 11 is a reproduction-only disc. When the information that has been read from the disc loaded into the drive 11 is information intrinsic to a writable disc, it can be determined that the disc loaded into the drive 11 is not a reproduction-only disc.

When the disc to be determined is a disc of the CD family and the disc is a multi-session disc, with Format=0010 (All Sub-Q) of the READ TOC/PMA/ATIP commands, it is determined whether the disc loaded into the drive 11 is a reproduction-only disc such as a CD or a CD-ROM disc or a writable disc such as a CD-R disc or a CD-RW disc.

In the case that the software 14 such as a game or installer software contains such a determining program, when the disc loaded into the drive 11 is initially accessed, the determining program determines whether the loaded disc is an original disc or a copied disc. When the disc is not an original disc, but a copied disc, access to the copied disc is restricted. As a result, with the conventional apparatus and format, copy protection can be accomplished.

The present invention is not limited to the foregoing embodiment. Instead, it should be understood by those skilled in the art that the foregoing and various other changes, omissions, and additions in the form and detail thereof may be made therein without departing from the spirit and scope of the present invention. For example, in the foregoing embodiment, the description was made with the computer system shown in FIG. 1. Instead, the present invention can be applied to a game apparatus, a CD player, a navigation system, and so forth.

According to the foregoing embodiment of the present invention, in a combination of the commands and determinations shown in FIG. 9 and FIG. 10, it is determined whether the loaded disc is a CD, a CD-ROM disc, a CD-R disc, or a CD-RW disc. However, according to the present invention, the commands and determination items are not limited to those shown in FIG. 9 and FIG. 10. When all the commands and determination items are combined, it can be securely determined whether the loaded disc is a CD, a CD-ROM disc, a CD-R disc, or a CD-RW disc. However, occasionally, the determination items can be divided or deleted.

As described above, according to the present invention, when information intrinsic to a writable disc can be read as valid information, it can be determined that the disc loaded into the drive is a writable disc. In contrast, when information intrinsic to a writable disc cannot be read as valid information, it can be determined that the disc is a read-only disc.

In addition, at least a condition with respect to record is read from TOC information of a disc. When the condition that has been read is a condition intrinsic to a read-only disc, it is determined that the disc loaded into the drive is a read-only disc. In contrast, when the condition that has been read is a condition intrinsic to a writable disc, it can be determined that the disc loaded into the drive is a writable disc.

A Q sub code is read from TOC information of a disc. When the Q sub code that has been read satisfies a condition intrinsic to a read-only disc, it can be determined that the disc loaded into the drive is a read-only disc. When the Q sub code that has been read satisfies a condition intrinsic to a writable disc, it can be determined that the disc loaded into the disc is a writable disc.

Thus, when a process for an original disc is performed for a read-only disc and a process for a copied disc for example access to disc information is restricted, copyright of information recorded on an original disc such as a CD/CD-ROM can be protected almost without need to change the current standard and apparatus.

DESCRIPTION OF REFERENCE NUMERALS

11 DRIVE
12 PC
13 INTERFACE
14 SOFTWARE
S1 ISSUE FORMAT=0011 (PMA) OF READ TOC/PMA/ATIP COMMANDS
S2 ERROR OR INVALID DATA?
ISSUE FORMAT=0100 (ATIP) OF READ TOC/PMA/ATIP COMMANDS.
S4 ERROR OR INVALID DATA?
S5 ISSUE FORMAT=0010 (ALL SUB-Q) OF READ TOC/PMA/ATIP COMMANDS.
S6 DO PMIN, PSEC, AND PFRAME IN THE CASE THAT ADR=0 AND PONT=B0 ACCORD WITH START TIME OF LEAD-OUT OF LAST SESSION?
S7 DOES LAST SESSION CONTAIN ADR=5 AND POINT=B0?
S8 ARE ALL MIN, SEC, FRAME, AND ZERO IN THE CASE THAT FIRST SESSION CONTAINS ADR=5 AND POINT=C0 0X00?
S9 ARE ALL PMIN, PSEC, AND PFRAME IN THE CASE THAT FIRST SESSION CONTAINS ADR=5 AND POINT=C0 0X95, 0X00, 0X00, RESPECTIVELY?
S10 DOES FIRST SESSION CONTAIN ADR=5 AND POINT=C1?
S11 OPERATION IN THE CASE THAT DETERMINED RESULT REPRESENTS THAT LOADED DISC IS ORIGINAL DISC (CD/CD-ROM) (REGULAR OPERATION ETC.).
S12 OPERATION IN THE CASE THAT DETERMINED RESULT REPRESENTS THAT LOADED DISC IS COPIED DISC (CD-R/RW) (MESSAGE IS DISPLAYED. OPERATION IS STOPPED IMMEDIATELY. ETC.).

The invention claimed is:
1. A method for controlling access to data of a disc, comprising the steps of:

determining whether or not q-channel information of a sub-code in a table-of-contents TOC of the disc, the q-channel information being intrinsic to a writable disc, has been detected from data that had been read from the disc, and determining whether the address field ADR of the TOC is set to ADR=5;

when the determined result represents that the q-channel information intrinsic to a writable disc has been detected and the ADR is set to 5, determining that the disc is a writable disc and at least restricting a regular operation of the disc; and when the determined result represents that the q-channel information intrinsic to a writable disc has not been detected, determining that the disc is not a writable disc and executing a regular operation of the disc.

2. The method for controlling access to data of a disc as set forth in claim 1, wherein when information that had been read from an area in which address information necessary for recording data is temporarily stored has been detected from the data that had been read from the disc, the step for determining that the disc is a writable disc is performed.

3. The method for controlling access to data of a disc as set forth in claim 1, wherein when control information that is necessary for recording data has been detected from the data that had been read from the disc, the step for determining that the disc is a writable disc is performed.

4. The method for controlling access to data of a disc as set forth in claim 1, wherein when at least any one of information with respect to the writing characteristic of a disc, information with respect to the capacity thereof and information with respect to the type thereof has been detected from the data that had been read from the disc, the step for determining that the disc is a writable disc is performed.

5. The method for controlling access to data of a disc as set forth in claim 4, wherein the information with respect to the writing characteristic, the information with respect to the capacity, and the information with respect to the type of the disc are contained in address information that has been recorded on the disc.

6. The method for controlling access to data of a disc as set forth in claim 1, wherein the disc has a data recording area in which data is recorded and a management area in which the TOC for data recorded in the recording area is recorded, and wherein the step for determining whether or not the disc is a writable disc is performed depending on whether predetermined management information of the TOC that has been read from the management area accords with information that represents the start position of lead-out.

7. The method for controlling access to data of a disc as set forth in claim 6, wherein when the predetermined management information does not accord with the information that represents the start position of the lead-out, the step for determining that the disc is a writable disc is performed.

8. The method for controlling access to data of a disc as set forth in claim 6, wherein when the predetermined management information accords with the information that represents the start position of the lead-out, the step for determining that the disc is not a writable disc is performed.

9. The method for controlling access to data of a disc as set forth in claim 1, wherein the disc has a data recording area in which data is recorded and a management area in which the TOC for data recorded in the recording area is recorded, and wherein when the predetermined information of the TOC that has been read from the management area includes information that is present in only a writable disc, the step for determining that the disc is a writable disc is performed.

10. The method for controlling access to data of a disc as set forth in claim 1, wherein the disc has a data recording area in which data is recorded and a management area in which the TOC for data recorded in the recording area is recorded, and wherein the predetermined management information of the TOC that has been read from the management area is not a predetermined value, the step for determining that the disc is a writable disc.

11. The method for controlling access to data of a disc as set forth in claim 10, wherein when the predetermined management information of the TOC that has been read from the management area is a predetermined value, the step for determining that the disc is not a writable disc is performed.

12. The method for controlling access to data of a disc as set forth in claim 10, wherein the TOC includes information with respect to at least time composed of a minute, a second, and a frame, and wherein when all the values of the minute, second, and frame of the information with respect to the time are 0x00, the step for determining that the loaded disc is not a writable disc is performed.

13. The method for controlling access to data of a disc as set forth in claim 10, wherein the TOC includes information with respect to at least time composed of a minute, a second, and a frame, and wherein when the values of the minute, second, and frame of the information with respect to the time are 0x95, 0x00, and 0x00, respectively, the step for determining that the disc is not a writable disc is performed.

14. The method for controlling access to data of a disc as set forth in claim 10, further comprising the steps of:

when the determined result represents that the disc is a writable disc, at least immediately stopping reading data from the disc; and when the determined result represents that the disc is not a writable disc, starting reading data from the disc.

15. The method for controlling access to data of a disc according to claim 1, wherein said step of determining further includes:

determining whether a PMIN, PSEC, and PFRAME field in the TOC represent a capacity of the disc.

16. A method for controlling access to data of a disc, comprising the steps of:

determining whether or not q-channel information of a sub-code in a table-of-contents TOC of the disc, the q-channel information being intrinsic to a writable disc has been detected from data that had been read from a disc having a data area in which data is recorded, a lead-in area that is formed at a position that is earlier read than the data area and on which index data of the data recorded in the data area is recorded, and a lead-out area formed on the outer periphery side of the data area, and determining whether the address field ADR of the TOC is set to ADR=5;

when the determined result represents that the q-channel information intrinsic to a writable disc has been detected and the ADR is set to 5, determining that the disc is a writable disc and restricting at least a regular operation for the disc; and when the determined result represents that the q-channel information intrinsic to a writable disc has not been detected, determining that the disc is not a writable disc and executing a regular operation for the disc.

17. The method for controlling access to data of a disc as set forth in claim 16, wherein when information that had been read from an area in which address information necessary for recording data is temporarily stored has been detected from the data that had been read from the disc, the step for determining that the disc is a writable disc is performed.

18. The method for controlling access to data of a disc as set forth in claim 16, wherein when control information that is necessary for recording data has been detected from the data that had been read from the disc, the step for determining that the disc is a writable disc is performed.

19. The method for controlling access to data of a disc as set forth in claim 16, wherein when at least any one of information with respect to the writing characteristic of a disc, information with respect to the capacity thereof, and information with respect to the type thereof has been detected from the data that had been read from the disc, the step for determining that the disc is a writable disc is performed.

20. The method for controlling access to data of a disc as set forth in claim 19, wherein the information with respect to the writing characteristic, the information with respect to the capacity, and the information with respect to the type of the disc are contained in address information that has been recorded on the disc.

21. The method for controlling access to data of a disc as set forth in claim 16, wherein the disc has a plurality of sessions each of which is composed of the lead-in area, the data area, and the lead-out area, wherein the TOC includes information with respect to time, and wherein the step for determining whether or not the disc is a writable disc depending on whether or not the time information of the TOC accords with the start time of the lead-out of the last session, determining whether or not the disc is a writable disc.

22. The method for controlling access to data of a disc as set forth in claim 21, wherein when the time information of the TOC does not accord with information that represents the start position of the lead-out, the step for determining that the disc is a writable disc is performed.

23. The method for controlling access to data of a disc as set forth in claim 21, wherein when the time information of the TOC accords with information that represents the start position of the lead-out, the step for determining that the disc is not a writable disc is performed.

24. The method for controlling access to data of a disc as set forth in claim 16, wherein the disc has a plurality of sessions each of which is composed of the lead-in area, the data area, and the lead-out area, and wherein when the TOC of the last session of the disc includes information intrinsic to a writable disc, the step for determining that the disc is a writable disc is performed.

25. The method for controlling access to data of a disc as set forth in claim 16, wherein the disc has a plurality of sessions each of which is composed of the lead-in area, the data area, and the lead-out area, wherein the the TOC includes information with respect to at least time composed of a minute, a second, and a frame, and wherein when the information with respect to the time that has been read from a first session of the disc is not a predetermined value, the step for determining that the disc is a writable disc is performed.

26. The method for controlling access to data of a disc as set forth in claim 25, wherein when the information with respect to the time is a predetermined value, the step for determining that the disc is a writable disc is performed.

27. The method for controlling access to data of a disc as set forth in claim 25, wherein when all the values of the minute, second, and frame of the information with respect to the time are 0x00, the step for determining that the disc is not a writable disc is performed.

28. The method for controlling access to data of a disc as set forth in claim 25, wherein when the values of the minute, second, and frame of the information with respect to the time are 0x95, 0x00, and 0x00, respectively, the step for determining that the disc is not a writable disc is performed.

29. The method for controlling access to data of a disc as set forth in claim 16, further comprising the steps of:

when the determined result represents that the disc is a writable disc, at least immediately stopping reading data from the disc; and when the determined result represents that the disc is not a writable disc, starting reading data from the disc.

30. The method for controlling access to data of a disc according to claim 16, wherein said step of determining further includes:

determining whether a PMIN, PSEC, and PFRAME field in the TOC represent a capacity of the disc.

31. A disc determining method, comprising the steps of:

determining whether or not q-channel information of a sub-code in a table-of-contents TOC of the disc, the q-channel information being intrinsic to a writable disc has been detected from data that had been read from a loaded disc, and determining whether the address field ADR of the TOC is set to ADR=5;

when the determined result represents that the q-channel information intrinsic to a writable disc has been detected and the ADR is set to 5, determining that the loaded disc is a writable disc; and when the determined result represents that the q-channel information intrinsic to a writable disc has not been detected, determining that the loaded disc is not a writable disc.

32. The disc determining method as set forth in claim 31, wherein when information that had been read from an area in which address information necessary for recording data is temporarily stored has been detected from the data that had been read from the loaded disc, the step for determining that the loaded disc is a writable disc is performed.

33. The disc determining method as set forth in claim 31, wherein when control information that is necessary for recording data has been detected from the data that had been read from the loaded disc, the step for determining that the loaded disc is a writable disc is performed.

34. The disc determining method as set forth in claim 31, wherein when at least any one of information with respect to the writing characteristic of a disc, information with respect to the capacity thereof, and information with respect to the type thereof has been detected from the data that had been read from the loaded disc, the step for determining that the loaded disc is a writable disc is performed.

35. The disc determining method as set forth in claim 34, wherein the information with respect to the writing characteristic, the information with respect to the capacity, and the information with respect to the type of the disc are contained in address information that has been recorded on the loaded disc.

36. The disc determining method as set forth in claim 31, wherein the loaded disc has a data recording area in which data is recorded and a management area in which the TOC for data recorded in the recording area is recorded, and wherein the step for determining whether or not the loaded disc is a writable disc is performed depending on whether predetermined management information of the TOC that has been read from the management area accords with information that represents the start position of lead-out.

37. The disc determining method as set forth in claim 36, wherein when the predetermined management information does not accord with the information that represents the start position of the lead-out, the step for determining that the loaded disc is a writable disc is performed.

38. The disc determining method as set forth in claim 36, wherein when the predetermined management information accords with the information that represents the start position of the lead-out, the step for determining that the loaded disc is not a writable disc is performed.

39. The disc determining method as set forth in claim 31, wherein the loaded disc has a data recording area in which data is recorded and a management area in which the TOC for data recorded in the recording area is recorded, and wherein when the predetermined information of the TOC that has been read from the management area includes information that is present in only a writable disc, the step for determining that the loaded disc is a writable disc is performed.

40. The disc determining method as set forth in claim 31, wherein the loaded disc has a data recording area in which data is recorded and a management area in which the TOC for data recorded in the recording area is recorded, and wherein the predetermined management information of the TOC that has been read from the management area is not a predetermined value, the step for determining that the disc is a writable disc.

41. The disc determining method as set forth in claim 40, wherein when the predetermined management information of the TOC that has been read from the management area is a predetermined value, the step for determining that the disc is not a writable disc is performed.

42. The disc determining method as set forth in claim 40, wherein the TOC includes information with respect to at least time composed of a minute, a second, and a frame, and wherein when all the values of the minute, second, and frame of the information with respect to the time are 0x00, the step for determining that the loaded disc is not a writable disc is performed.

43. The disc determining method as set forth in claim 40, wherein the TOC includes information with respect to at least time composed of a minute, a second, and a frame, and wherein when the values of the minute, second, and frame of the information with respect to the time are 0x95, 0x00, and 0x00, respectively, the step for determining that the disc is not a writable disc is performed.

44. The disc determining method according to claim 31, wherein said step of determining further includes:
determining whether a PM1N, PSEC, and PFRAME field in the TOC represent a capacity of the loaded disc.

* * * * *